Patented Aug. 16, 1938

2,126,947

UNITED STATES PATENT OFFICE 2,126,947

FOOD PRODUCT AND PROCESS OF MAKING

Emory L. Cocke, Atlanta, Ga.

No Drawing. Application December 7, 1936,
Serial No. 114,643

2 Claims. (Cl. 99—2)

This invention relates to food products, and in particular, to such products embodying citrus fruit, and also the processes of making the same.

One object of this invention is to provide a food product consisting of citrus fruit, especially oranges and grapefruit, to which has been added a mineralizing mixture adapted to provide a more balanced food by adding the minerals normally missing in such citrus fruits, and desirable for the human or animal diet.

Another object is to provide a food product consisting of citrus fruit and edible minerals suitable for human and animal diet, wherein the citrus fruit sugars have been inverted from sucrose into dextrose and levulose, the cell structure of the citrus fruit being broken down to facilitate the mineralization of the fruit.

Another object is to provide a food product for human or animal consumption consisting of citrus fruit and a mixture of dietary minerals containing such elements as iodine, potassium, calcium, magnesium, phosphorus, iron and/or copper sulphate so proportioned as to make a balanced food product.

Another object is to provide a food product consisting of heat-treated citrus fruit containing dietary minerals, the mixture thereof being pressed and dehydrated.

Another object is to provide a process of making a food product consisting in mixing dietary minerals with citrus fruit, especially oranges and grapefruit, heat-treating this mixture, pressing the mixture and dehydrating the mixture to remove the excess moisture therefrom.

Another object is to provide a process of making a food product consisting in mixing dietary minerals with citrus fruit, heat-treating the mixture to break down the ceullular structure and to invert the normal sucrose to dextrose and levulose, applying pressure to alter the cellular structure still further, as well as to reduce the moisture content, and dehydrating the pressed mixture to furnish the food product in dry form. Preferably a steaming and cooking treatment is employed to burst or disintegrate the cellular structure of the citrus fruit being processed.

Another object is to provide a process of making a food product consisting in reducing citrus fruit to slices or small particles, and adding a mixture of dietary minerals, such as calcium and/or magnesium carbonates and/or phosphates, together with an iodide, an iron salt and copper sulphate.

Another object is to provide a process of making a food product consisting in reducing citrus fruit to a product similar in appearance, size, color and weight to dried beet pulp and to have the same or closely approximating the same water-absorbing and feeding qualities as dried beet pulp.

Hitherto, when quantities of citrus fruits have been unmarketable, it has been necessary to convert them into juice and to dispose of the remainder of the pulp or peel by burying it as a fertilizer, or by collecting it as garbage. Attempts have been made to feed this citrus fruit residue to livestock, particularly dairy cattle, but the results were unsuccessful because the milk obtained from the cows so fed had an objectionable flavor. At the same time, the citrus fruit residue was not easily digested, either by human beings or by animals, because of the difficulty of absorbing the digestive fluids into the thick cellular wall structure of the fruit. Moreover, the dry matter of citrus fruits is approximately fifty per cent. sugar, largely in sucrose form, whereas dextrose and levulose are much more suitable for animal nutrition.

Furthermore, under present-day conditions, both human beings and livestock suffer from mineral deficiencies in their diet more than occurred previously when dietary and living conditions were quite different. In recent times the mineral supply in soils has become considerably depleted and there are less mineral-bearing foods, feeds and roughages easily available. To make matters worse, the intensive efforts to raise the production per head of cattle of meat and milk, through intensive feeding and management and by more scientific breeding, make greater demands as regards mineral requirements. When the necessary minerals are lacking, nutritional anemia results.

For many years it was generally believed that steaming or cooking increased the digestibility of all foods and feeds. Recent researches have shown that this is not always the case, except with certain foods, feeds, oil seeds, etc., and particularly in juiced citrus fruit, and for instance, Irish potatoes. As the value of the food product is determined by its percentage of digestibility and its after effect, it is important to alter the citrus fruit into such a form as will enhance these properties. Juiced citrus fruits have a high fiber content, hence, are less digestible than those with a low fiber content for the reason that the higher the fiber content the thicker and more resistant to the penetration of the digestive fluids are the cell walls.

By the present invention a balanced mixture of certain dietary minerals is added to citrus fruit. The exact proportions of these dietary minerals will depend upon the locality in which the food product is to be used. Soils differ widely in their characteristics, and in some sections are more deficient in certain elements necessary for animal diet than in other sections. The plants grown in these soils will therefore be similarly deficient, and the animals eating these plants will suffer from a lack of the necessary dietary minerals. In Florida, for example, where citrus fruits, such as oranges and grapefruit, will be processed under the present invention, the soils are deficient in one or more of the elements potassium, magnesium, calcium, phosphorus, iron or copper. The forage and vegetable crops are therefore deficient in these missing elements. The mineralizing part of the present invention supplies the deficiency in these minerals by adding the necessary minerals to the citrus fruit product during the processing thereof. In the practice of this invention it has been found satisfactory to add eight-tenths of one per cent. of the balanced mineral mixture described below to a given amount of oranges or grapefruit.

In the process of the present invention the citrus fruit, such as oranges or grapefruit, is reduced to smaller portions, as by slicing, cutting and/or sawing, and the dietary mineral mixture added thereto. This mixture of minerals is a combination of various elements necessary to the human or animal diet, and consisting of one or more of the various elements iodine, potassium, calcium, phosphorus, iron, copper and sulphur. These are so proportioned according to the locality or purpose as to make them a most efficient and effective dietary product, the proportions of which have been developed by extensive nutritional experimentation over a period of years. As previously stated, the exact proportions of these dietary minerals may be varied in certain localities, or a standard mixture which will be a suitable compromise for conditions over a general area, may be adopted. One such example of a balanced mineral mixture for this purpose is as follows:

| | Pounds |
|---|---|
| Oyster shell flour | 2,000 |
| Dolomitic limestone | 1,000 |
| Dicalcium phosphate | 1,000 |
| Ferric oxide | 50 |
| Copper sulphate | 2 |
| Potassium iodide | 1 |

The oyster shell flour provides carbonate of lime or calcium carbonate. The dolomitic limestone provides a mixed carbonate of calcium and magnesium, and the dicalcium phosphate provides both calcium and phosphorus in edible form. The ferric oxide and copper sulphate, respectively, provide iron, copper and sulphur, and the potassium iodide provides the iodine necessary for the functioning of the various glands, such as the thyroid gland. It will be understood, however, that the invention is not limited either to the specific proportions or to the particular combination of minerals. One or more of these minerals may be omitted to provide a balanced food product for certain localities the soils of which are adequately supplied with the omitted mineral or minerals.

After the mixture of minerals has been added to the citrus fruit, the entire product is placed in an inclosed vessel or vat and subjected to heat-treatment such as a cooking or steaming process, preferably accompanied by agitation of the mixture. This heat-treatment has several effects and advantages. The heating or cooking completely changes the cellular structure of the citrus fruit, causing the walls of the plant cells to be broken down, thereby facilitating the entry of the mineral mixture so as to produce a homogeneous mineralized food product. The breaking down of the cells also enables the easy expression of excess moisture, this operation previously having been very difficult. The cooking or heat-treating also increases the digestibility of the citrus fruit, especially by inverting the sucrose into dextrose and levulose, as previously stated. Levulose is one of the sweetest of sugars and therefore makes citrus fruit more palatable. Without the heat-treatment, however, the sucrose normally present in the citrus fruit would not invert into dextrose and levulose because it is the action of the applied heat which causes the inherent or natural citric acid to hydrolyze the sucrose into dextrose and levulose.

Furthermore, the heat-treatment removes the objection previously found against the feeding of uncooked or unheated citrus fruit to dairy cattle, because the previously noted objectionable taste in milk from such cows is completely eliminated by the process of the present invention. No new or objectionable taste has ever been found in milk from cows eating the heat-treated, dehydrated citrus fruit product of the present invention.

The constant agitation of the mass while being heat-treated enables the more thorough mixture of the various ingredients. While the heat-treating process is being carried out the steaming treatment causes the cellular structure of the citrus fruit to burst or disintegrate. This not only facilitates the penetration thereof by the mineral mixture, but also makes it easier to remove excess water and citrus oils. During heat-treatment the heated mass is subjected to mechanical pressure, thereby making the cellular structure more flexible, and removing moisture and fruit oils. The moisture content is reduced from about 85 per cent. to between 70 and 75 per cent. The mechanical pressure is applied by a vertical, continuous hydraulic press, which simultaneously cooks and steams the product while pressure is being applied thereto. The fruit oils and fruit salts removed from the mass by this hydraulic pressure are recovered and made available for subsequent use by filtration and evaporation.

After the heat-treating and pressing steps have been carried out, the cooked and pressed mineralized particles of citrus fruit are then subjected to a dehydrating process. This removes all excess moisture and leaves the particles of mineralized citrus fruit different in shape, form and appearance, and in a more palatable and nutritious form than hitherto produced. This mineralized and dehydrated citrus may, if desired, be further subdivided into smaller pieces or, optionally, it may be ground into flour or meal-like particles. These mineralized food products are easily packed, transported and shipped to various parts of the country, or even to different parts of the world. When properly stored they are without danger of deterioration. This is in striking contrast to the rapid deterioration of untreated citrus fruit. The present invention, therefore, utilizes for a valuable food product a product which was previously waste and without appreciable value.

The invention may be practiced broadly with any citrus fruit, but oranges and grapefruit are found preferable for processing. This is due to the fact that limes and lemons have a high citric acid content as compared with oranges and grapefruit.

The invention is also to be distinguished from the food product known variously as dried beet pulp, dried sugar beet pulp, gray beet pulp or light gray beet pulp, etc. The mineralized citrus fruit food product, especially when made from oranges or grapefruit, affords a balanced diet which is decidedly superior in nutritive value to these sugar beet pulp preparations. The food product of the present invention may, however, by the practice of the foregoing process, be made so similar in form, weight, appearance, color and water-absorbing properties as to be readily substituted for dried beet pulp and acceptable to livestock already accustomed to the beet pulp.

In the practice of the process of this invention, the preferred arrangement of apparatus is as follows:

(a) Receiving tanks for the citrus fruit.
(b) Slicing, cutting, or other subdividing machines.
(c) Machines for adding and mixing in the mineral mixture with the citrus fruit.
(d) Treatment tanks.
(e) Steaming, cooking, or other heat-treating apparatus.
(f) Presses which simultaneously press and heat-treat the product, as by cooking and steaming.
(g) Dehydrating apparatus for drying the product.
(h) Dust-collecting device.
(i) Sacking and weighing or packaging machines.

It will be understood that I desire to comprehend within this invention such modifications as come within the scope of the claims and the invention.

Having thus fully described my invention, what I claim as new and desire to secure by Letters Patent, is:

1. In a method of producing a stock food, steaming citrus fruits to soften and explode the pulp cells therein, and simultaneously inverting the sucrose therein to dextrose and levulose by heating, and adding dietary minerals thereto, utilizing the steaming to impregnate the pulp having the broken cells as a result of the steaming.

2. In a method of producing a stock food, steaming citrus fruits to soften and explode the pulp cells therein, and simultaneously inverting the sucrose therein to dextrose and levulose by heating, adding dietary minerals thereto, utilizing the steaming to impregnate the pulp having the broken cells as a result of the steaming, applying mechanical pressure to said pulp while being so steamed to expel the major portion of the fluids therefrom, and dehydrating the remaining fluids from the resulting product.

EMORY L. COCKE.